United States Patent
Kubozuka et al.

(10) Patent No.: US 6,509,709 B2
(45) Date of Patent: Jan. 21, 2003

(54) STEPPING MOTOR CONTROLLER

(75) Inventors: Eiji Kubozuka, Kiryu (JP); Hitoshi Ando, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 09/934,558

(22) Filed: Aug. 23, 2001

(65) Prior Publication Data

US 2002/0024315 A1 Feb. 28, 2002

(30) Foreign Application Priority Data

Jul. 10, 2001 (JP) ........................................ 2001-208629

(51) Int. Cl.[7] .............................................. G05B 19/40
(52) U.S. Cl. ........................ 318/685; 318/686; 318/254
(58) Field of Search ................. 318/685, 686, 318/254

(56) References Cited

U.S. PATENT DOCUMENTS

| | | | | |
|---|---|---|---|---|
| 3,932,793 A | * | 1/1976 | Muller | 318/138 |
| 4,319,174 A | * | 3/1982 | Cook et al. | 318/432 |
| 4,450,517 A | * | 5/1984 | Sundstrom | 318/696 |
| 4,495,455 A | * | 1/1985 | Araki | 318/685 |
| 4,511,833 A | * | 4/1985 | Kawaguchi et al. | 318/685 |
| 4,763,347 A | * | 8/1988 | Erdman | 318/254 |
| 5,296,792 A | * | 3/1994 | Knierim | 318/254 |
| 5,838,127 A | * | 11/1998 | Young et al. | 318/119 |
| 6,332,506 B1 | * | 12/2001 | Kifuku | 180/404 |
| 6,373,207 B1 | * | 4/2002 | Yablonovitch | 318/362 |

* cited by examiner

Primary Examiner—Rita Leykin
(74) Attorney, Agent, or Firm—Birch, Stewart, Kolasch & Birch, LLP

(57) ABSTRACT

The stepping motor controller comprising an excitation signal generator, a switching circuit, a PWM constant current control circuit and a current sensor further comprises a motor detector circuit that transmits a control signal for generating a constant current for a predetermined time for detecting the motor, a constant current generator that receives the control signal and generates the constant current to be supplied to the winding, a reference voltage generator that generates a reference voltage, a voltage comparator circuit that compares the reference voltage with a voltage drop at the winding, and a current value setting signal generator circuit that transforms an output of the voltage comparator circuit into a current value setting signal for the PWM constant current control circuit. An output of the current value setting signal generator circuit is connected to a current value setting terminal of the PWM constant current control circuit.

6 Claims, 1 Drawing Sheet

STEPPING MOTOR CONTROLLER

BACKGROUND OF THE INVENTION

1. Field of the Invention

This invention relates to a stepping motor controller, more particularly, it relates to a stepping motor controller that enables automatic setting of a current set value for a stepping motor of a constant current control type.

2. Description of the Prior Art

A stepping motor controller being currently used comprises an excitation signal generator, a switching circuit, a winding of the stepping motor, a PWM (Pulse Width Modulation) constant current control circuit, a current sensor and a current setting circuit.

The excitation signal generator receives input pulse signals and generates excitation signals for controlling excitation sequence for the winding of the stepping motor. The switching circuit comprising a plurality of switching devices receives the excitation signals and controls the current in the winding. The PWM constant current control circuit controls the current in the switching circuit to be a predetermined set value. The current sensor detects the current flowing through the winding of the stepping motor. The current setting circuit is connected to a current setting terminal of the PWM constant current control circuit to set the current set value in the PWM constant current control circuit.

In general, the current setting circuit comprises a voltage divider comprising a fixed resistance and a variable resistance connected in series between a power source VM and the ground. The output voltage of the voltage divider is connected to the current value setting terminal of the PWM constant current control circuit.

In general, a stepping motor comprises a plurality of windings. However, since the stepping motor controller of the present invention can be composed of a single winding in the stepping motor, the following description will be made referring to only the single winding in the stepping motor.

The switching circuit that controls one of the windings of the stepping motor comprises a plurality of switching devices consisting of, for example, first, second, third and fourth switching devices. Collectors of the first and the third switching devices are connected in series. Likewise, collectors of the second and the fourth switching devices are connected in series. One end of the winding is connected to a node of the collectors of the first and the third switching devices, whereas another end of the winding is connected to a node of the collectors of the second and the fourth switching devices. Emitters of the first and the second switching devices are connected to the power source VM. Emitters of the third and the fourth switching devices are grounded through the current sensor.

The PWM constant current control circuit receives an output of the current sensor and transmits a control signal to the excitation signal generator to make a current in the switching circuit be the current set value set by the current setting circuit.

The excitation signal generator transmits excitation signals to the corresponding bases of the switching devices each time when an input pulse signal arrives to make a pair of switching devices comprising the first and the fourth switching devices, or another pair of switching devices comprising the second and the third switching devices, of the switching circuit, alternately become "on" state and to make the current flowing through the winding become the set value mentioned above.

Thus, when the first pulse signal arrives at the excitation signal generator, the first and the fourth switching devices become "on" state, and the current flows through the winding from its one end connected to the first switching device into another end connected to the fourth switching device. Further, when the second pulse signal arrives at the excitation signal generator, the first and the fourth switching devices become "off" state, the second and the third switching devices become "on" state, and the current flows through the winding from its another end connected to the second switching device in to the one end connected to the third switching device. Thus, the stepping motor is driven by the current reversing its flow direction each time when a pulse signal arrives.

The current flowing through the winding is detected by the current sensor, then transmitted to the PWM constant current control circuit, where the current is controlled to be the current set value set by the current setting circuit.

In the stepping motor controller as stated above, the current set value of the PWM constant current control circuit needs to be adjusted so as to be in conformity with the specification (resistance) of the winding of the motor to be used, since the specification (resistance) of the winding of the motor differs according to the uses.

Heretofore, the current set value is set by a user handling individually the variable resistance of the current setting circuit according to the specification (resistance) of the winding of the motor to be used.

In case that the current set value is set manually by a user, it sometimes occurs that the set value may not be set correctly enough, and accordingly, the stepping motor may not exhibit its performance as expected, or the stepping motor may be overheated.

SUMMARY OF THE INVENTION

The object of the present invention is to provide a stepping motor controller that automatically detects specification of a stepping motor with a different winding specification (resistance), automatically sets a current set value for a PWM constant current control circuit corresponding to the winding specification (resistance) of the stepping motor, and enables to perfectly eliminate manual setting of the current set value.

According to the present invention to achieve the above object, a stepping motor controller comprising;

an excitation signal generator which receives input pulse signals and generates excitation signals for controlling excitation sequence for a winding of a stepping motor, a switching circuit that receives the excitation signals and controls the excitation sequence for the winding of the stepping motor by a plurality of switching devices, a PWM constant current control circuit for controlling current flowing through the switching circuit to be a predetermined current set value, and a current sensor for detecting current flowing through the winding, characterized in that the stepping motor controller further comprises a motor detector portion comprising;

a motor detector circuit that transmits a control signal for generating a constant current for a predetermined time for detecting the motor, a constant current generator that receives the control signal and generates the constant current to be supplied to the winding, a reference voltage generator that generates a reference voltage, a voltage comparator circuit that compares the reference voltage with a voltage drop at the winding, and a current value setting signal generator circuit that transforms an output of the voltage comparator circuit into a current value setting signal for the PWM constant current control circuit, wherein an output of the current value setting signal generator circuit is connected to a current value setting terminal of the PWM constant current control circuit, is provided.

In the stepping motor controller according to the present invention, the constant current generator supplies the constant current to the winding, then the voltage comparator circuit compares the reference voltage with a voltage drop at the winding, and then the current value setting signal generator circuit transforms the reference voltage corresponding to the voltage drop at the winding into the current value setting signal for the PWM constant current control circuit, and the current value setting signal is supplied to the current value setting terminal of the PWM constant current control circuit. Accordingly, specification of a different stepping motor with a different winding specification (resistance) can be automatically detected, the current set value of the PWM constant current control circuit can be automatically set corresponding to the specification (resistance) of the stepping motor, and manual setting of the current set value can be perfectly eliminated.

DETAILED DESCRIPTION OF THE INVENTION

Figure 1:
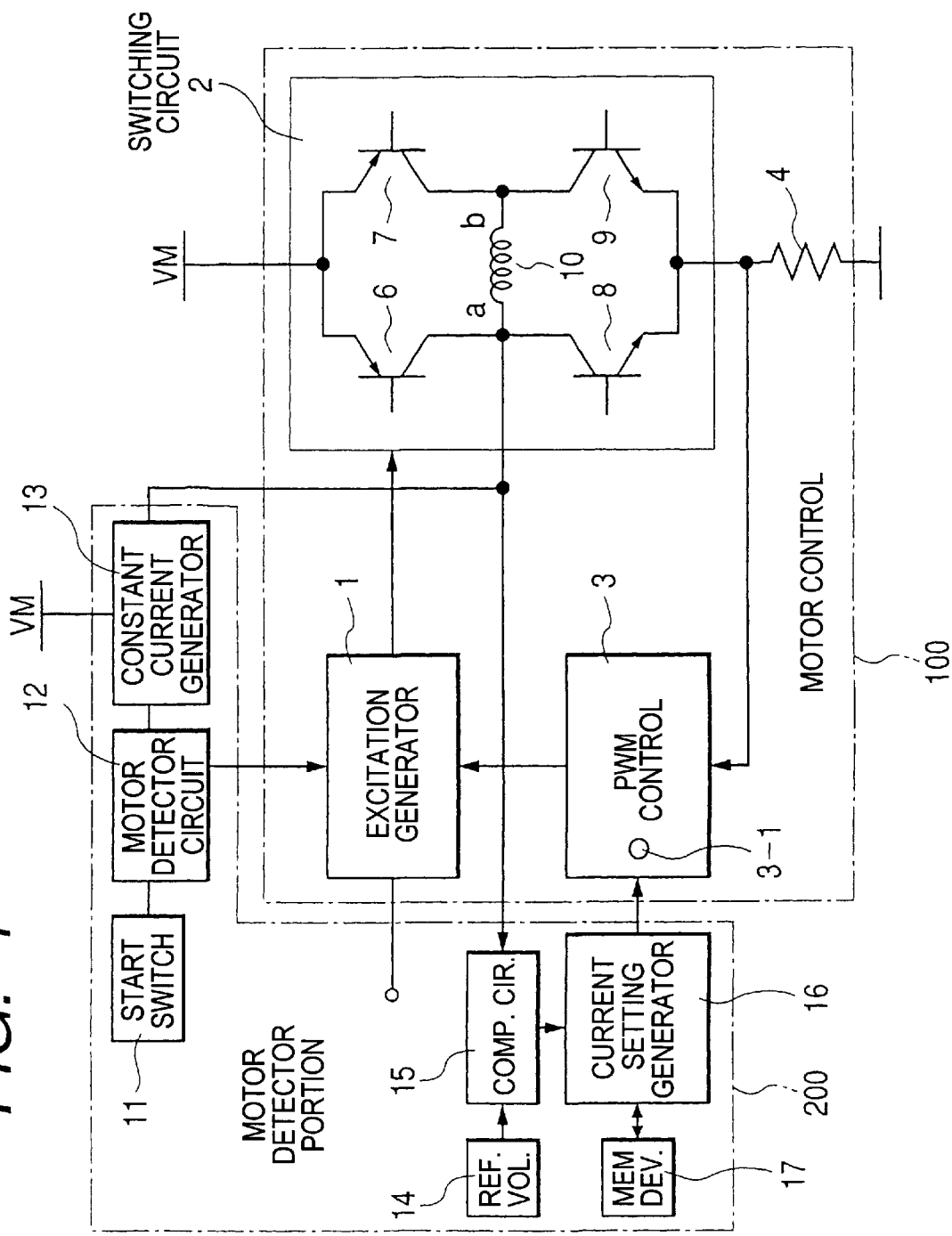
FIG. 1 is a circuit diagram of the principal part of a stepping motor controller according to the present invention.

The stepping motor controller according to an embodiment of the present invention, as shown in FIG. 1, comprises a motor control portion 100 and a motor detector portion 200.

The motor control portion 100 comprises an excitation signal generator 1, a switching circuit 2, a PWM constant current control circuit 3 and a current sensor 4.

The excitation signal generator 1 receives input pulse signals and generates excitation signals for controlling excitation sequence for a winding 10 of the stepping motor.

The switching circuit 2 comprises a plurality of switching devices, receives the excitation signals and controls the current in the winding 10.

The PWM constant current control circuit 3 controls the current of the switching circuit 2 to be a predetermined value.

The current sensor 4 detects the current flowing through the winding 10.

The switching circuit 2 that controls one of the windings 10 of the stepping motor comprises a first switching device 6, a second switching device 7, a third switching device 8 and a fourth switching device 9. Collectors of the first and the third switching devices 6 and 8 are connected in series at a node a. Likewise, collectors of the second and the fourth switching devices 7 and 9 are connected in series at a node b. One end of the winding 10 is connected to the node a at which the collectors of the first and the third switching devices 6 and 8 are connected. Also, another end of the winding 10 is connected to the node b at which the collectors of the second and the fourth switching devices 7 and 9 are connected. Emitters of the first and the second switching devices 6 and 7 are connected to a power source VM. Emitters of the third and the fourth switching devices 8 and 9 are grounded through the current sensor 4.

The PWM constant current control circuit 3 receives an output of the current sensor 4 and transmits a control signal to the excitation signal generator 1 to make the current in the switching circuit 2 be a current value set by a current value setting signal generator circuit 16 of the motor detector portion 200 that will be explained later.

The excitation signal generator 1 transmits excitation signals to the corresponding bases of the switching devices 6, 7, 8 and 9 each time when an input pulse signal arrives to make a pair of switching devices comprising the first switching device 6 and the fourth switching device 9, or another pair of switching devices comprising the second switching device 7 and the third switching device 8, of the switching circuit 2, alternately become "on" state and to make the current flowing through the winding 10 become the current value set by the current value setting signal generator circuit 16 mentioned above.

Thus, when the first pulse signal arrives at the excitation signal generator 1, the first switching device 6 and the fourth switching device 9 become "on" state, and the current flows through the winding 10 from the left end to the right end in FIG. 1. Further, when the second pulse signal arrives at the excitation signal generator 1, the first switching device 6 and the fourth switching device 9 become "off" state, the second switching device 7 and the third switching device 8 become "on" state, and the current flows through the winding 10 from the right end to the left end in FIG. 1. Thus, the stepping motor is driven by the current reversing its flow direction each time when a pulse signal arrives.

The current flowing through the winding 10 is detected by the current sensor 4, and then the detected value is transmitted to the PWM constant current control circuit 3, where the current is controlled to be the current set value set by the current value setting signal generator circuit 16.

The motor detector portion 200 comprises a motor detector circuit start switch 11, a motor detector circuit 12, a constant current generator 13, a reference voltage generator 14, a voltage comparator circuit 15, a current value setting signal generator circuit 16 and a readable rewritable non-volatile memory device 17 attached to the current value setting signal generator circuit 16.

The motor detector circuit start switch 11 starts the motor detector portion 200.

The motor detector circuit 12 transmits a signal to the constant current generator 13 to make it generate a constant current for a predetermined time, for the winding 10 to monitor certain motor parameters or conditions such as the current resistance of winding 10.

The constant current generator 13 generates the constant current for detecting the motor.

The reference voltage generator 14 generates a reference voltage.

The voltage comparator circuit 15 compares a voltage drop at the winding 10 with the reference voltage.

The current value setting signal generator circuit 16 sets a current value setting signal to be supplied to the PWM constant current control circuit 3.

The readable rewritable non-volatile memory device 17 stores the current value setting signal.

A power input terminal of the constant current generator 13 that generates the constant current for monitoring certain motor parameters is connected to the power source VM. An output terminal of the constant current generator 13 is connected to the node a at which the collectors of the first and the third switching devices 6 and 8 of the switching circuit 2 are connected. The output terminal of the constant current generator 13 is also connected to one end of the voltage comparator circuit 15. An output of the motor detector circuit start switch 11 is connected to the motor detector circuit 12. An output of the motor detector circuit 12 is connected to the constant current generator 13 that generates the constant current for monitoring certain motor parameters or conditions such as the current resistance of winding 10, and to the excitation signal generator 1. Another end of the voltage comparator circuit 15 is connected to the reference voltage generator 14. Further, an output of the voltage comparator circuit 15 is connected to the current value setting signal generator circuit 16. An output of the current value setting signal generator circuit 16 is connected to a current value setting terminal 3-1 of the PWM constant current control circuit 3. The readable rewritable non-volatile memory device 17 is attached to the current value setting signal generator circuit 16.

The operation of the stepping motor controller according to the present invention, as shown FIG. 1, is as follows.

Firstly, one end of the winding 10 is connected to the node a and another end of the winding 10 is connected to the node b. These nodes a and b are motor winding nodes of the stepping motor controller.

Then, the motor detector circuit start switch 11 is turned "on" while no pulse signal enters into the excitation signal generator 1. Then, the motor detector circuit 12 starts and sends a signal to the excitation signal generator 1. The excitation signal generator 1 controls the first to the fourth switching devices 6, 7, 8 and 9 in the switching circuit 2 such that only the fourth switching device 9 turns "on" and all of the other switching devices, the first to the third switching devices 6, 7 and 8, turn "off". On the other hand, the constant current generator 13 that generates the constant current for monitoring certain motor parameters or conditions such as the current resistance of winding 10 is started and the current flows from the constant current generator 13 through the winding 10 into the current sensor 4. Then, the voltage drop at the winding 10 is compared with the reference voltage in the reference voltage generator 14 by the voltage comparator circuit 15. The reference voltage of the reference voltage generator 14 is varied automatically until it coincides with the voltage drop at the winding 10. When the reference voltage in the reference voltage generator 14 coincides with the voltage drop at the winding 10, the reference voltage is fixed at this voltage. The voltage of the reference voltage generator 14 that coincides with the voltage drop at the winding 10 is transmitted from the voltage comparator circuit 15, as its output voltage, into the current value setting signal generator circuit 16. Then, an output of the current value setting signal generator circuit 16 is transmitted into the current value setting terminal 3-1 of the PWM constant current control circuit 3 to make the current set value conformable to the specification (resistance) of the winding 10.

The output voltage of the voltage comparator circuit 15 is a voltage proportional to the specification (resistance) of the winding 10, since it is a voltage coincides with the voltage drop at the winding 10 when the constant current is flowing through the winding 10.

On the other hand, the relation between the specification (resistance) of the winding 10 and the voltage to be entered into the PWM constant current control circuit 3 to obtain the corresponding current set value of the PWM constant current control circuit 3 is known beforehand. Therefore, by transforming, in the current value setting signal generator circuit 16, the output voltage of the voltage comparator circuit 15 that is proportional to the specification (resistance) of the winding 10 into the voltage corresponding to the one to be entered into the PWM constant current control circuit 3, and by entering it to the current value setting terminal 3-1 of the PWM constant current control circuit 3, the current set value corresponding to the specification (resistance) of the winding 10 can be set automatically in the PWM constant current control circuit 3.

The setting of the current set value is finished in a very short time. Power supply to the constant current generator 13 for generating the constant current for detecting the motor is cut off after a predetermined time set by a timer installed in the motor parameter detector circuit 12. At the same time, the motor parameter detector circuit 12 transmits a signal to stop the detecting of the motor parameters and to return into normal excitation sequence, and the motor parameter detecting operation is terminated.

Once the motor parameter detecting operation is performed and the current set value is set at the time when a stepping motor is changed, the current set value in the PWM constant current control circuit 3 is held at the optimum value and the stepping motor can be driven in the optimum operating condition.

When the motor parameter detecting operation is performed, the current value setting signal generator circuit 16 instructs the attached readable rewritable non-volatile memory device 17 to store the output of the current value setting signal generator circuit 16 The information stored in the readable rewritable non-volatile memory device 17 never vanishes even when the power is cut off. Accordingly, upon reconnecting the power, the output of the current value setting signal generator circuit 16 stored in the readable rewritable non-volatile memory device 17 can be supplied to the current value setting terminal 3-1 of the PWM constant current control circuit 3.

In the embodiment explained above, the motor parameter detector circuit start switch 11 for starting the detection of a motor was turned "on" manually. Alternatively, the detection of motor parameters may also be started automatically using a voltage signal detected by a source voltage detection circuit for detecting the power source voltage when the power is connected.

Control elements such as the motor parameter detector circuit 12, the constant current generator 13, the reference voltage generator 14, the voltage comparator circuit 15 and/or the current value setting signal generator circuit 16 composing the motor parameter detector portion 200 can be composed of microcomputers.

In the stepping motor controller according to the present invention, the winding 10 of the motor is connected to the motor winding nodes a and b of the stepping motor controller, then the motor detector circuit 12 is started. Then, the constant current generator 13 works, the current flows from the constant current generator 13 to the winding 10 of the motor and to the current sensor 4. Then, the voltage coinciding with the voltage drop at the winding 10 of the motor is supplied to the current value setting signal generator circuit 16. Then, the current value setting signal conformable to the specification (resistance) of the winding 10 of the motor is generated by the current value setting signal generator circuit 16 and the current value setting signal is supplied to the PWM constant current control circuit 3.

Accordingly, the specification (resistance) of a different stepping motor can be automatically detected by a simple operation, the current value setting signal to be supplied to the PWM constant current control circuit 3 can be set automatically and exactly corresponding to the specification (resistance) of the stepping motor, and manual setting of the current set value can be perfectly eliminated.

What is claimed is:

1. A stepping motor controller comprising;

an excitation signal generator that receives input pulse signals and generates excitation signals for controlling excitation sequence for a winding of a stepping motor, a switching circuit that receives said excitation signals and controls said excitation sequence for said winding of said stepping motor by a plurality of switching devices, a PWM constant current control circuit for controlling current flowing through said switching circuit to be a predetermined current set value, and a current sensor for detecting current flowing through said winding, characterized in that said stepping motor controller further comprises a motor detector portion comprising;

a motor detector circuit that periodically transmits a control signal for generating a constant current for a predetermined time between said excitation signals for detecting the current resistance of the winding of the motor, a constant current generator that receives said control signal and generates said constant current to be supplied to said winding, a reference voltage generator that generates a reference voltage, a voltage comparator circuit that compares said reference voltage with a voltage drop at said winding indicative of said current resistance, and a current value setting signal generator circuit that transforms an output of said voltage comparator circuit into a current value setting signal for said PWM constant current control circuit, wherein an output of said current value setting signal generator circuit is connected to a current value setting terminal of said PWM constant current control circuit.

2. The stepping motor controller according to claim 1, wherein a readable rewritable non-volatile memory device is attached to said current value setting signal generator circuit, said output of said current value setting signal generator circuit is stored in said memory device, and said output stored in said memory device is transmitted to said current value setting terminal of said PWM constant current control circuit when a power source is reconnected after it was cut off.

3. The stepping motor controller according to claim 1, wherein said motor detector circuit is started by a switch operated manually.

4. The stepping motor controller according to claim 2, wherein said motor detector circuit is started by a switch operated manually.

5. The stepping motor controller according to claim 1, wherein a power source voltage is detected and said motor detector circuit is started by said power source voltage detected.

6. The stepping motor controller according to claim 2, wherein a power source voltage is detected and said motor detector circuit is started by said power source voltage detected.

* * * * *